(12) United States Patent
Zhu (10) Patent No.: US 12,149,039 B2
(45) Date of Patent: Nov. 19, 2024

(54) WIDE GAIN BANDWIDTH C-BAND OPTICAL FIBER AMPLIFIER

(71) Applicant: OFS Fitel, LLC, Norcross, GA (US)

(72) Inventor: Benyuan Zhu, Princeton, NJ (US)

(73) Assignee: OFSFITEL, LLC, Norcross, GA (US)

( * ) Notice: Subject to any disclaimer, the term of this patent is extended or adjusted under 35 U.S.C. 154(b) by 934 days.

(21) Appl. No.: 17/264,824

(22) PCT Filed: Aug. 29, 2019

(86) PCT No.: PCT/US2019/048942
§ 371 (c)(1),
(2) Date: Jan. 31, 2021

(87) PCT Pub. No.: WO2020/047339
PCT Pub. Date: Mar. 5, 2020

(65) Prior Publication Data
US 2021/0296844 A1 Sep. 23, 2021

Related U.S. Application Data (60) Provisional application No. 62/725,029, filed on Aug. 30, 2018.

(51) Int. Cl.
*H01S 3/067* (2006.01)
*H01S 3/094* (2006.01)
(Continued)

(52) U.S. Cl.
CPC ...... *H01S 3/06766* (2013.01); *H01S 3/06758* (2013.01); *H01S 3/094046* (2013.01);
(Continued)

(58) Field of Classification Search
CPC ............. H01S 3/06766; H01S 3/06758; H01S 3/094046; H01S 3/302; H01S 2301/04
See application file for complete search history.

(56) References Cited

U.S. PATENT DOCUMENTS 6,359,725 B1 * 3/2002 Islam ................. H04B 10/2916
359/341.32
6,392,788 B1   5/2002 Yoon et al.
(Continued)

FOREIGN PATENT DOCUMENTS

JP      H1184440      3/1999
WO    WO 03076979    9/2003

OTHER PUBLICATIONS

Krzczanowitz et al. "Hybrid Discrete Raman/EDFA Design for Broadband Optical Amplification in Metro WDM Systems", 2017 19th International Conference on Transparent Optical Networks (ICTON), Girona, Spain, 2017, pp. 1-4, doi: 10.1109/ICTON.2017.8025083. (Year: 2017).*

(Continued)

*Primary Examiner* — Eric L Bolda
(74) *Attorney, Agent, or Firm* — Law Office of Wendy Kebo, Esq.

(57) ABSTRACT

A fiber amplifier that is particularly configured to provide gain across a large extent of the C-band spectral range (i.e., a gain bandwidth of at least 42 nm, preferably within the range of 46-48 nm) utilizes a specially-designed discrete Raman amplifier in combination with a high inversion level EDFA to extend the gain bandwidth of a conventional EDFA C-band optical amplifier, while maintaining the gain ripple below an acceptable value. The EDFA provides operation at a highly-inverted level and the specialized discrete Raman amplifier (sDRA) element has particular parameters (dispersion, length, effective area) selected to maintain operation within a "small gain" regime while also extending the long wavelength edge of the gain bandwidth and reducing the gain ripple attributed to the EDFA component.

24 Claims, 8 Drawing Sheets

(51) Int. Cl.
*H01S 3/16* (2006.01)
*H01S 3/30* (2006.01)

(52) U.S. Cl.
CPC ............ *H01S 3/1693* (2013.01); *H01S 3/302* (2013.01); *H01S 2301/04* (2013.01)

(56) References Cited

U.S. PATENT DOCUMENTS

| | | | |
|---|---|---|---|
| 7,079,738 | B2 | 7/2006 | Nakamura et al. |
| 7,085,039 | B2 | 8/2006 | Foursa et al. |
| 2001/0033412 | A1* | 10/2001 | Vavassori ........... H01S 3/06758 359/341.3 |
| 2002/0008901 | A1* | 1/2002 | Kinoshita ............... H01S 3/302 359/341.1 |
| 2002/0191276 | A1* | 12/2002 | Onaka ................. H01S 3/06758 359/341.2 |
| 2003/0035207 | A1 | 2/2003 | Gray et al. |
| 2003/0169482 | A1* | 9/2003 | Kung ...................... H01S 3/302 359/341.1 |
| 2003/0179440 | A1 | 9/2003 | Foursa et al. |
| 2003/0210876 | A1* | 11/2003 | Gaarde .............. H04B 10/2525 385/123 |
| 2004/0190846 | A1 | 9/2004 | Nakamura et al. |

OTHER PUBLICATIONS

Ali et al. "Effect of EDF position on the performance of Hybrid Dispersion-Compensating RamanlEDF Amplifier", 2013 IEEE 4th International Conference on Photonics (ICP), Melaka, Malaysia, 2013, pp. 187-189, doi: 10.1109/ICP.2013.6687109. (Year: 2013).*

Chi, Roghua et. al., "Gain Saturation and nonlinear effect of erbium-doped fiber amplifier/discrete compensating Raman amplifier hybrid fiber amplifiers in the C-band", Optical Engineering, vol. 43, No. 2, Feb. 1, 2004, pp. 346-349.

* cited by examiner

WIDE GAIN BANDWIDTH C-BAND OPTICAL FIBER AMPLIFIER

CROSS-REFERENCE TO RELATED APPLICATIONS

This application claims the benefit of U.S. Provisional Application No. 62/725,029 filed Aug. 30, 2018, and herein incorporated by reference.

TECHNICAL FIELD

The present invention relates to fiber-based optical amplifiers and, more particularly, to an erbium-doped fiber amplifier (EDFA) that is configured to provide gain across a large extent of the C-band spectral range, using a specially-designed fiber Raman amplifier to extend the gain bandwidth and reduce gain ripple to an acceptable level.

BACKGROUND OF THE INVENTION

The EDFA has been widely deployed in optical fiber communication systems as a result of superior performance in terms of high power conversion efficiency (PCE), low noise figure (NF). A typical prior art C-band EDFA operates within the optical wavelength range of 1528-1565 nm (also expressed as a gain bandwidth on the order of about 37 nm). Going forward, it will be important for applications such as telecommunications to increase the gain bandwidth of the C-band EDFA up to at least 42 nm, and preferably to 46-48 nm (i.e., extending the wavelength range to about 1525-1573 nm). This additional 10 nm or so of bandwidth over which acceptable levels of gain may be achieved allows for the capacity of the transmission system to be increased, reduce system cost, allow for adaptive signal modulation formats to be used, and the like.

While it is possible to extend the EDFA gain bandwidth by, for example, modifying dopant concentrations within the gain fiber, the result is a significant increase in non-uniformity in the amount of gain provided at different individual wavelengths (referred to as "gain ripple"), perhaps to the level that a conventional gain flattening filter (GFF) cannot compensate for the variations in gain. This approach of extending the gain bandwidth necessarily reduces power conversion efficiency (PCE) and increases the noise figure (NF), both contrary to the desired system requirements.

Another approach to extending the gain bandwidth for a C-band optical amplifier is to utilize a conventional discrete Raman amplifier (DRA) instead of an EDFA. While providing an extended gain bandwidth, DRAs are known to have lower PCE and higher NF than EDFAs, and are also susceptible to other technical problems such as multi-path interference (MPI) associated with double Rayleigh scattering, and nonlinear impacts associated with the relatively small effective area of the fibers used in a DRA structure. Distributed Raman amplifiers (which utilize the in-place transmission fiber instead of a separate "gain fiber" as provided in a discrete Raman amplifier), as well as various types of "hybrid" fiber amplifiers based on a combination of an EDFA with a distributed Raman amplifier, have been found to still exhibit practical problems associated with installation. For example, there are known problems related to splicing and safety issues, as well as relying on the in-place transmission fiber as the amplifying medium for the distributed Raman amplifier.

SUMMARY OF THE INVENTION

The needs remaining in the art are addressed by the present invention, which relates to fiber-based optical amplifiers and, more particularly, to an erbium-doped fiber amplifier (EDFA) that is particularly configured to provide gain across a large extent of the C-band spectral range, using a specially-designed discrete Raman amplifier in combination with a high inversion level EDFA to extend the gain bandwidth of a C-band optical amplifier while maintaining the gain ripple below an acceptable value.

In accordance with the principles of the present invention, a wide gain bandwidth C-band fiber-based optical amplifier is proposed that utilizes an EDFA (operating at a highly-inverted level) that is by a specialized discrete Raman amplifier (sDRA) element with particular parameters selected to increase gain at the long wavelength edge of the C-band, while also reducing the gain ripple attributed to operating the EDFA at a relatively high inversion level. The sDRA component of the present invention maintains operation in a "small gain" regime (e.g., no greater than 4 dB average gain), achieved, for example, by using a relatively short length of optical gain fiber. In particular, a length of les than about 6 km (preferably less than 4 km, and more particularly in the range of about 2-4 km) has been found to maintain the gain within the "small gain" regime). In addition to, or instead of using a small length of optical gain fiber, the sDRA may be configured to operate within the "small gain" regime through control of the pump power (i.e., a relatively low power) and/or the Raman gain coefficient of the fiber itself.

An exemplary embodiment of the present invention takes the form of fiber-based C-band optical amplifier comprising erbium-doped fiber amplifier (EDFA) module and a discrete Raman amplifier (DRA) module. The EDFA module is configured to operate at a highly inverted level and includes a section of erbium-doped optical fiber responsive to pump light from a first laser pump source operating at a power level sufficient to achieve a high inversion level. The DRA module includes a section of Raman optical gain fiber for receiving as an input one or more optical signals propagating at wavelengths within the C-band range and a second laser pump source for supplying pump light to the section of optical gain fiber. The section of Raman optical gain fiber is chosen to have a combination of length, Raman gain coefficient and pump power that maintains operation of the DRA within a small gain regime (e.g., less than 7 dB). The combination of the EDFA module and the DRA module provides a gain bandwidth of at least 42 nm within the C-band wavelength range of 1525-1573 nm.

Another exemplary embodiment of the present invention relates to a method of amplifying optical signals propagating at wavelengths within the C-band range of 1525-1573 nm, comprising the steps of: (1) applying multiple optical input signals operating in the C-band range as an input to a discrete Raman amplifier (DRA), the DRA configured to exhibit a tilted gain profile with increasing gain for longer wavelengths, no greater than 6.6 dB for a long wavelength edge of 1573 nm and an average gain no greater than 4 dB for the complete C-band wavelength range; (2) providing amplified optical output signals as a small gain regime output from the sDRA, the amplification following the tilted gain profile; (3) and applying the amplified optical output signals from the DRA as an input to an erbium-doped fiber amplifier (EDFA) operating at an inversion level of at least 0.69, the combination of the EDFA and DRA creating a gain bandwidth of at least 42 nm.

Other and further embodiments and aspects of the present invention will become apparent during the course of the following discussion and by reference to the accompanying drawings.

BRIEF DESCRIPTION OF THE DRAWINGS

Referring now the drawings.

DETAILED DESCRIPTION

Typical prior art EDFAs used to amplify optical signals in the C-band are known to provide acceptable gain only within the limited band between 1528 nm and 1565 nm (i.e., a gain bandwidth of about 37 nm). A goal of the present invention is to extend this gain bandwidth to a value of at least 42 nm, and preferably in the range of 46-48 nm, providing gain over the wavelength of 1525-1573 nm.

As will be described below, an EDFA operating at a relatively high inversion level (e.g., no less than about 0.69) is used to create a majority of the overall gain with a specialized discrete Raman amplifier (sDRA) having particular Raman gain fiber characteristics (in terms of length, as well as perhaps dispersion and/or effective area) utilized to augment the gain spectrum of the high inversion level EDFA so that the combination has a wide bandwidth and exhibits a gain ripple that may be controlled by a conventional gain flattening filter (GFF). Since the EDFA has a fixed wavelength range, the specialized DRA is able to extend the wavelength range over which gain is achieved (extended on the long wavelength edge).

Figure 1:
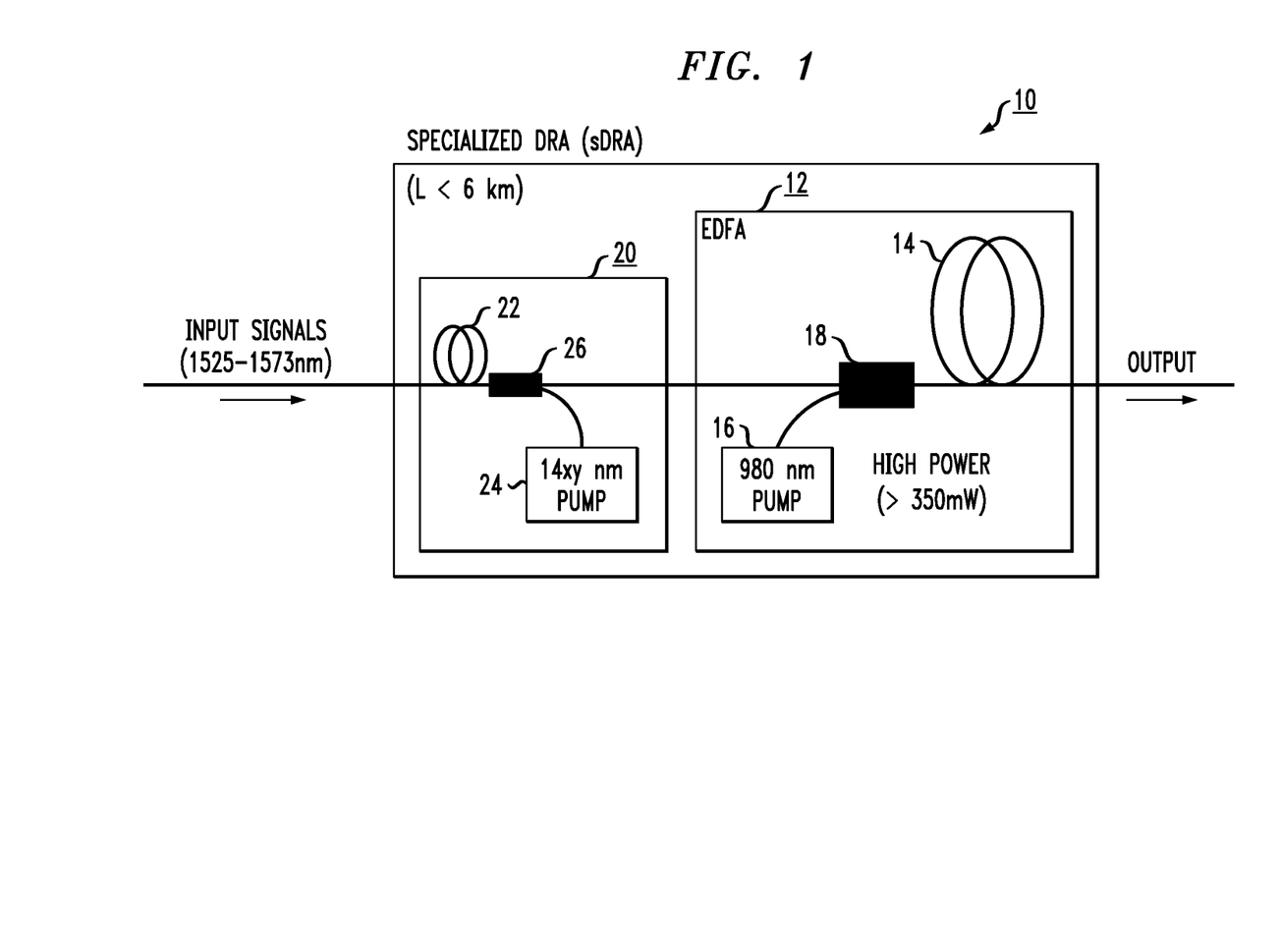
FIG. 1 illustrates an exemplary wide gain bandwidth C-band optical amplifier formed in accordance with the present invention.

FIG. 1 illustrates an exemplary C-band optical amplifier 10 formed in accordance with the principles of the present invention, utilizing a high inversion level EDFA at the output side to provide a majority of the gain and a specialized DRA (sDRA) at the input side to extend the long wavelength edge of the gain bandwidth and ensure that the gain ripple is manageable. As shown in FIG. 1, C-band optical amplifier 10 is responsive to multiple optical input signals operating at wavelengths within the C-band range of 1525-1673 nm.

Amplifier 10 is shown as comprising an EDFA module 12 that includes a length of erbium-doped fiber 14 and a pump light source 16. An optical coupler 18 (such as a WDM coupler) is used to introduce pump light into erbium-doped fiber 14, where in the configuration of amplifier 10 the pump light propagates in the same direction as the input signals (i.e., co-pumped). Pump light source 16 includes a laser diode operating at a wavelength of about 980 nm, with source 16 configured to provide a relatively high output power. The relatively high output power is utilized to ensure that a majority of the erbium ions within doped fiber 14 are "inverted" and thus provide a significant portion (i.e., a majority) of the gain when interacting with the inputs signals passing through doped fiber 14. For the purposes of the present invention, an inversion level of 0.69 (i.e., 69% of erbium ions inverted into higher energy state) has been found to be acceptable. An inversion level on the order of about 0.72 is considered as preferred.

In accordance with the present invention, the ability to extend the gain bandwidth for C-band fiber-based optical amplifiers is provided by including a specially-designed discrete Raman amplifier (sDRA) in the overall amplifier configuration. An exemplary sDRA 20 is shown in FIG. 1 as comprising a relatively short section of optical fiber 22 (have a length L less than about 6 km, and preferably within the range of 2-4 km). Optical fiber 22, hereinafter referred to as "Raman gain fiber 22" is backward-pumped by a semiconductor laser 24 operating at a pump wavelength in the range of about 1464-1472 nm. A second WDM coupler 26 is used to inject this pump light into the output of fiber 22 so that the pump light counter-propagates with respect to the input optical signals, thus providing the "backward-pumped" configuration. In some cases. Raman gain fiber 22 is configured to have a relatively small effective area ($A_{eff}$), on the order of 20 µm².

Figure 2:
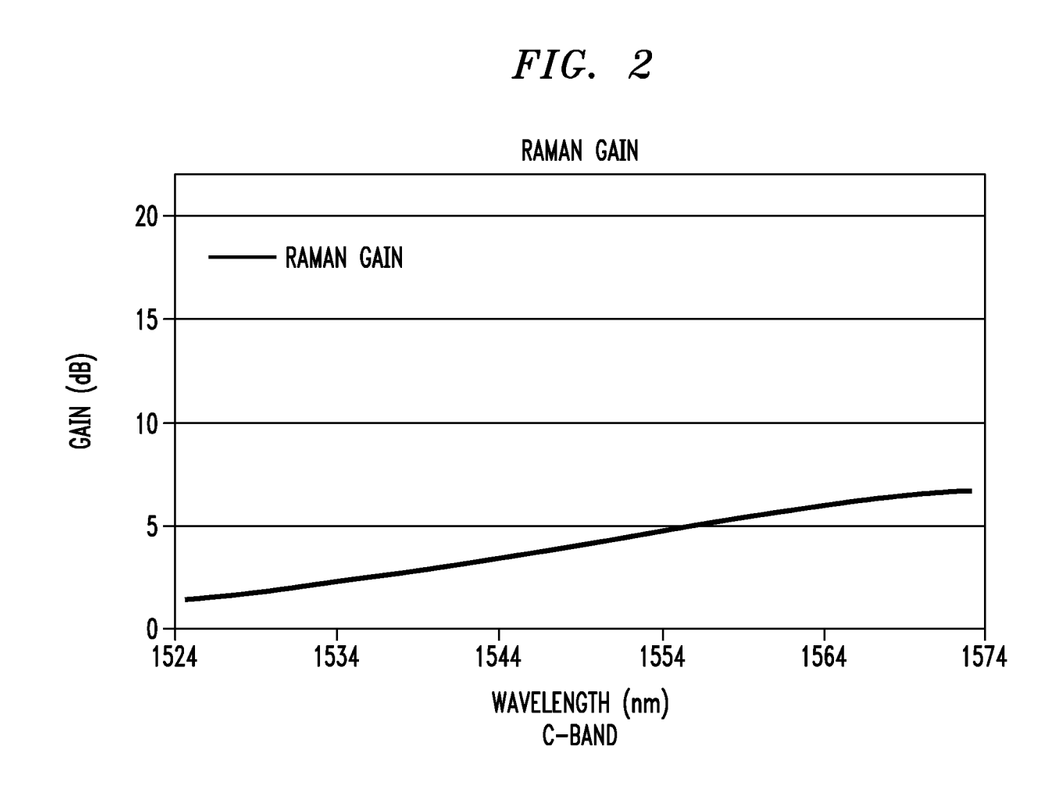
FIG. 2 contains a plot of gain as a function of wavelength for the specialized discrete Raman amplifier utilized in the amplifier as shown in FIG. 1.

In order to achieve low noise figure (NF) and minimize the nonlinear impairment from sDRA 20, Raman gain fiber 22 needs to exhibit a high Raman gain coefficient, low attenuation at both pump and signal. The gain profile of an exemplary sDRA 20 is plotted in FIG. 2. As shown, its profile is tilted toward the long wavelength end of the C band, providing a maximum gain of no greater than 6.6 dB at the longest wavelength of 1573 nm. In contrast to conventional distributed Raman amplifiers, where a relatively long length of transmission fiber (for example, tens of kms) is used as the gain medium, the "discrete" Raman amplifier utilized in accordance with the present invention is a self-contained module that is coupled to an existing transmission fiber. Thus, for a discrete Raman amplifier, the amount of gain provided may be controlled by, for example, selecting a length and effective area (or, alternatively, the pump power and Raman gain coefficient) of the Raman gain fiber suitable for that purpose. In accordance with the present invention, it is intended to maintain sDRA 20 operating in a "small gain" regime (i.e., a gain no greater than about 7.0 dB at the long wavelength end of the C-band range). A length L of Raman gain fiber suitable for this purpose may be as short as 6 km, where lengths on the order of 2-4 km preferred to ensure small gain regime operation. Preferably, sDRA 20 has an average gain value of 4.0 dB (e.g., from 1.5 dB at 1525 nm to 6.6 dB at 1573 nm). By maintaining the gain of sDRA 20 at this relatively low level, its combination with an EDFA operating at an inversion level of at least 0.69 results in achieving a gain bandwidth of at least 42 nm with an acceptable level of gain ripple.

Figure 3:
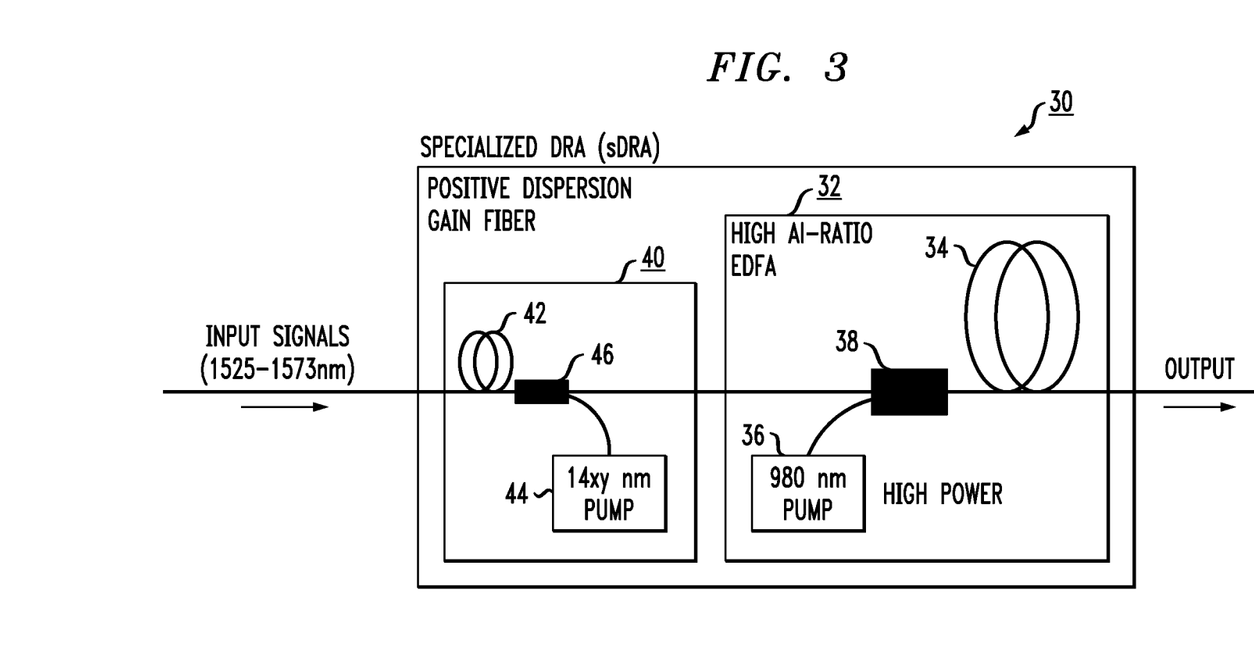
FIG. 3 shows an alternative embodiment of the present invention, where a wide gain bandwidth C-band optical amplifier utilizes a high Al-ratio EDFA and a discrete Raman amplifier based upon a positive dispersion gain fiber.

FIG. 3 illustrates an alternative embodiment of the present invention, where an extended gain bandwidth C-band optical amplifier 30 includes an EDFA 32 that exhibits an increased level of gain by using a gain fiber co-doped with aluminum as well as erbium. A high power pump source 34 is used to provide pump light at 980 nm, with a first WDM 36 used to couple the pump light to an input of high Al-ratio gain fiber 32. As with the embodiment illustrated in FIG. 1, a co-pumped configuration is preferred so that the maximum level of pump power interacts with the maximum power of the propagating optical signals.

In accordance with this embodiment of the present invention, EDFA 32 includes a section of gain fiber 34 that is co-doped with both erbium and aluminum, preferably formed to have a high aluminum content. The presence of the Al dopant is known to increase the level of gain achieved, while retaining a relatively low noise figure (NF). In particular, the concentration of Al is known to have a large influence on the gain spectrum of erbium-doped fiber. As is known in the art, the absorption level at 1480 nm is a very sensitive measure of the variation in Al co-doping concentration in erbium-doped fiber. The ratio between absorption at 1480 nm (denoted $\alpha_{1480nm}$) and a peak absorption (denoted $\alpha_{peak}$) is defined as the "Al-ratio" and is chosen as a measurable parameter to differentiate between different aluminum doping levels and monitor for spectrum uniformity/consistency. For the purposes of the present invention, a high Al-ratio (e.g., $\alpha_{1480nm}/\alpha_{peak}$ of about 0.446 (more broadly, greater than about 0.44 and in some instances greater than about 0.46) allows for the amplifier to create additional gain while operating at the desired high inversion level, while also maintaining the desired low NF and wide gain bandwidth.

Figure 4:
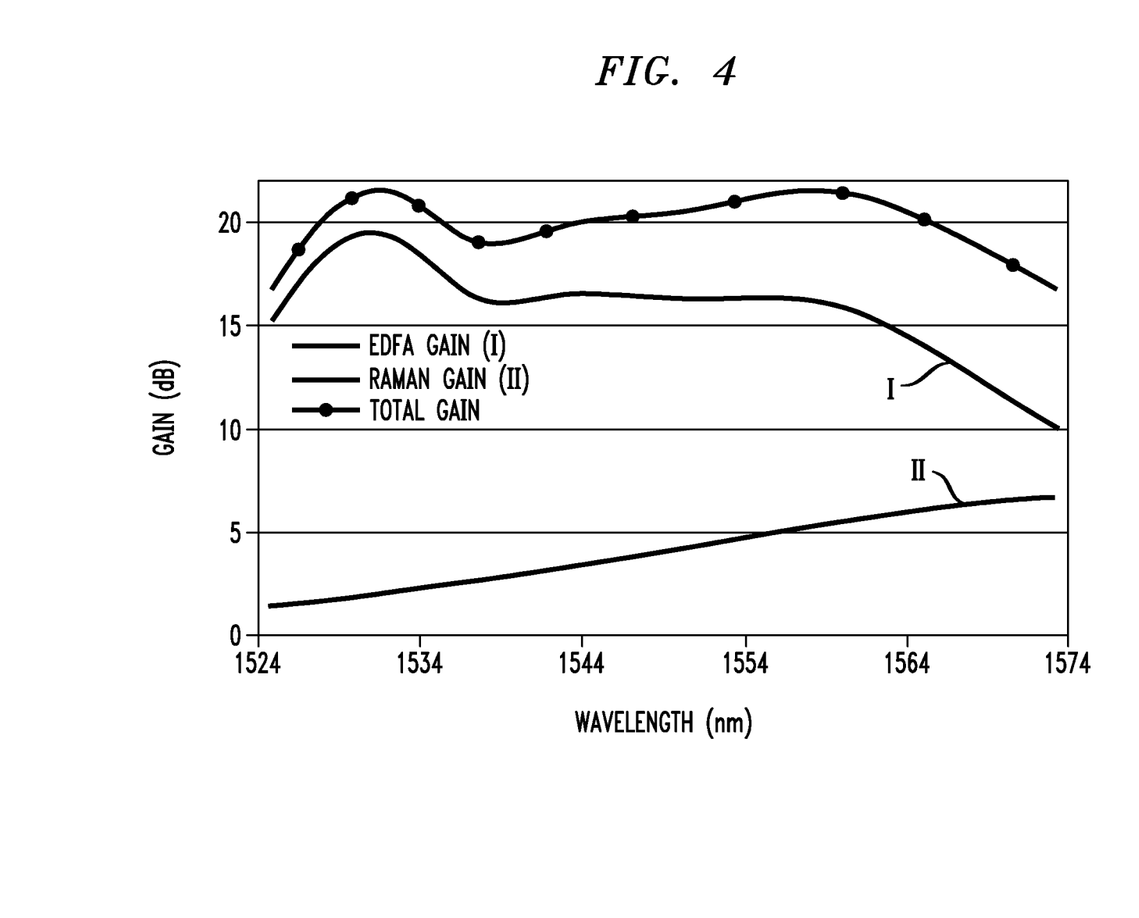
FIG. 4 contains a set of plots showing gain as a function of wavelength for the specialized DRA, the high Al-ratio EDFA, and an exemplary inventive amplifier formed by the combination of the specialized DRA and the high Al-ratio EDFA.

FIG. 4 contains a plot of the gain profile for an exemplary high Al-ratio EDFA, such as EDFA 32 shown in FIG. 3 (denoted as plot I in FIG. 4). The use of a high Al-ratio EDFA is shown as providing a gain greater than 15 dB over the wavelength range of 1525 to about 1560 nm (i.e., a gain bandwidth of about 35 nm). For this type of high Al-ratio EDFA, it is difficult to extend the gain bandwidth much beyond this 35 nm range through fiber design, amplifier design, or changes to glass composition without significantly compromising gain flatness, NF, and power conversion efficiency (PCE).

Referring back to the embodiment as shown in FIG. 3, amplifier 30 includes an sDRA 40 that is formed from a short length (i.e., 6 km or less) of "positive dispersion" optical fiber 42 (hereinafter referred to as "Raman gain fiber 42"). A Raman pump source 44 is used as the supply for the pump light, with a second WDM coupler 46 used to coupling the Raman pump light into an output of the positive dispersion Raman gain fiber 42. While shown in the preferred counter-pumped configuration in FIG. 3, it is to be understood that sDRA 40 may also be configured as a co-pumped arrangement, particularly if the relative intensity noise (RIN) of pump source 44 is sufficiently low.

Chromatic dispersion is a measure of the difference in propagation velocities of different wavelengths through a fiber. "Positive dispersion" specifically refers to particular fiber compositions where longer wavelength light propagates faster than short wavelength light (this is in contrast to conventional "negative dispersion" fibers where the opposite effect occurs). Positive dispersion, while not typically used in a discrete Raman amplifier, is desirable in this particular application to avoid the nonlinear inter- and intra-channel impairments typically found in coherent transmission systems. For the purposes of the present invention, a positive dispersion value of at least 10 ps/nm*km at 1550 nm is preferred, but not required. In the broadest sense, as long as the Raman gain fiber exhibits a non-zero dispersion, it will properly function as a "nonlinear" element that extends the gain bandwidth of the C-band amplifier.

The gain associated with sDRA 40 is also shown in FIG. 4 (plot 1I), which also shows the total amplifier gain from the combination of high Al-ratio EDFA 32 and sDRA 40, which is shown to result in a total average gain of 20 dB and a gain bandwidth of 48 nm. A conventional gain flattening filter (GFF) can be used to compensate the gain ripple of 4.7 dB.

Figure 5:
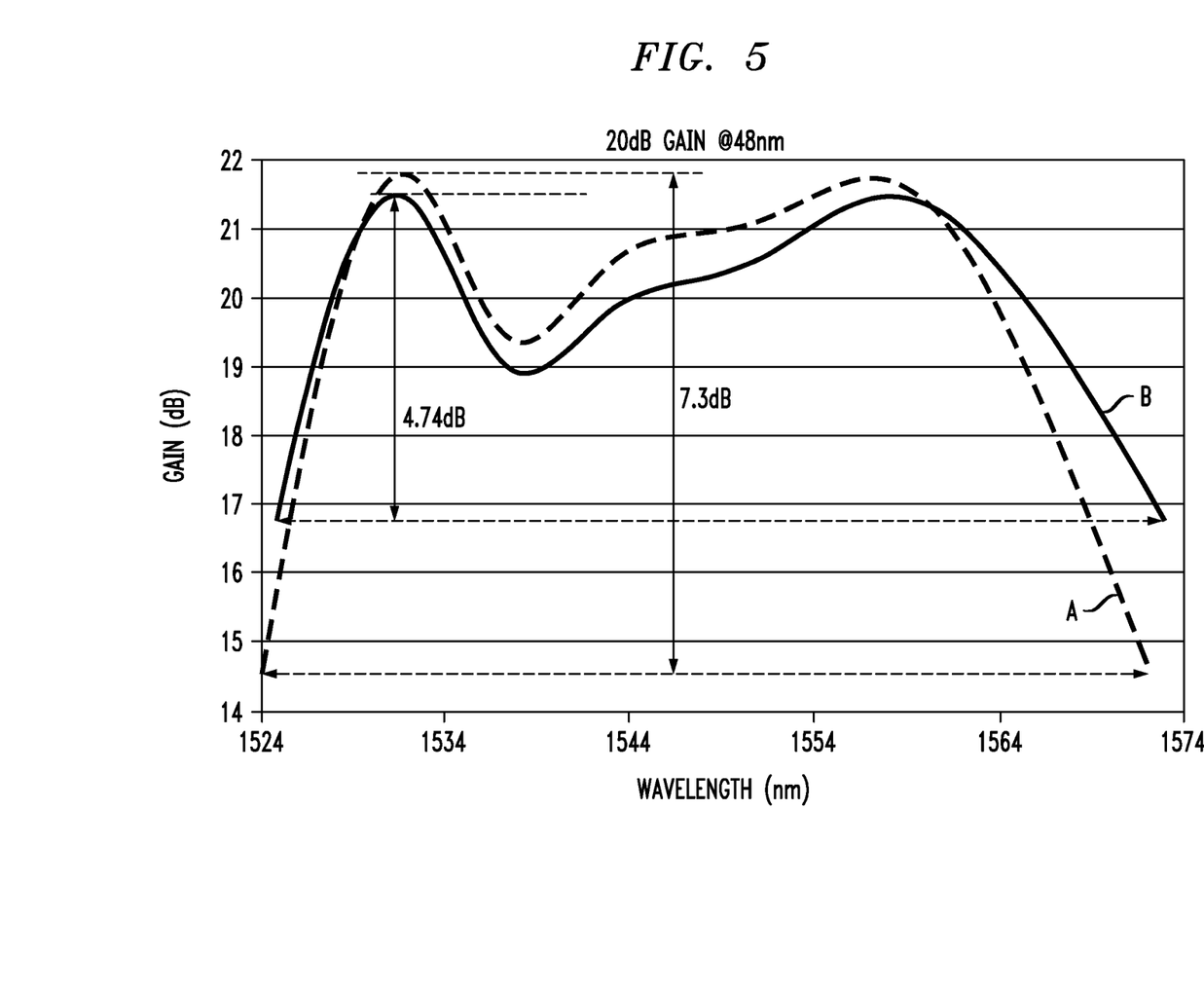
FIG. 5 has comparative gain profile plots for an EDFA operated at conditions required to provide an increased bandwidth, and an amplifier of the present invention (comprising a combination of a specialized DRA with a high Al-ratio EDFA), showing the reduction of gain ripple and extension of gain bandwidth provided by the inventive amplifier configuration.

FIG. 5 contains a graph that better illustrates the improvement in performance by using a specialized DRA (sDRA) in combination with a high Al-ratio EDFA to provide a gain bandwidth approaching 48 nm in the C-band operating wavelength range. Plot A in FIG. 5 is the gain profile associated with a high Al-ratio EDFA operating as a C-band amplifier. By using a sufficiently high power pump input (e.g., 600 mW pump power), a high Al-ratio EDFA is able to be driven to exhibit a gain bandwidth approaching the desired 48 nm value, but this occurs at the expense of introducing significant ripple to gain. As shown in FIG. 5, the associated ripple is on the order of 7.3 dB, which results in an unacceptably low PCE value and, moreover, is beyond the capabilities of correction with a typical gain flattening filter.

Plot B of FIG. 5 illustrates the improvement in performance by incorporating a specialized DRA (having the features described above) with the high Al-ratio EDFA. As shown, the gain bandwidth now extends further along the long wavelength edge of the C band, and the gain ripple is reduced to a value of 4.74 dB (a ripple that may be compensated by using a conventional gain flattening filter).

Figure 6:
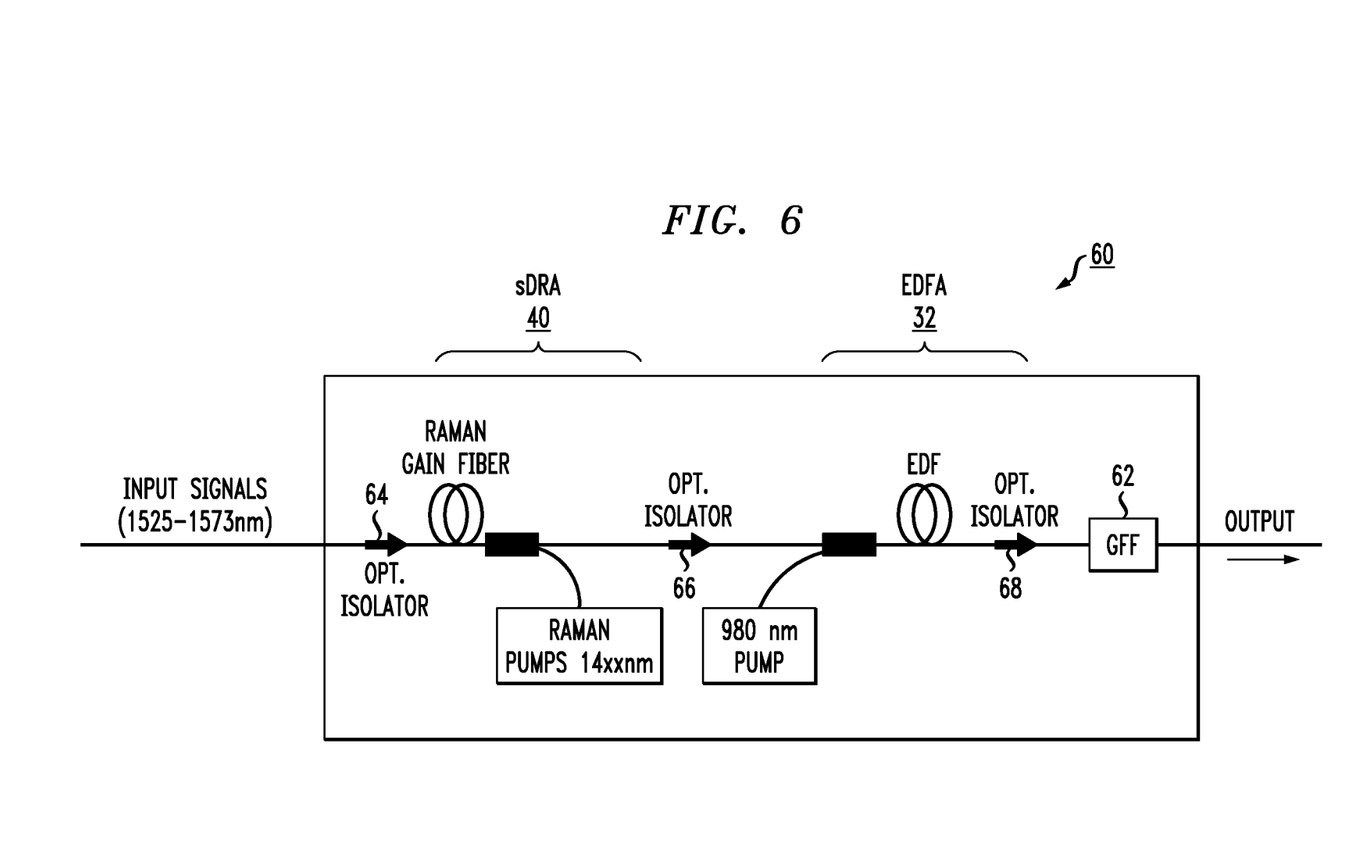
FIG. 6 illustrates another embodiment of a wide gain bandwidth C-band optical amplifier formed in accordance with the present invention.

FIG. 6 illustrates another fiber-based C-band optical amplifier formed in accordance with one or more embodiments of the present invention. Here, an exemplary optical amplifier 60 is shown as including high Al-ratio EDFA 32 and sDRA 40, as described above in association with FIG. 3. Also shown in the embodiment of FIG. 6 is a gain flattening filter (GFF) 62 disposed at the output of EDFA 32. Using techniques well-known in the art, GFF 62 is able to reduce the remaining gain ripple of 4.74 dB to a value of, for example, about 0.2-0.3 dB, providing essentially uniform gain over the complete bandwidth of C-band optical amplifier 60. Optical isolators are also included as components of C-band optical amplifier 60, used to reduce the amount of noise that is generated by reflected optical signals. As shown, isolators 64, 66, and 68 are disposed at the input of sDRA 40, the input of EDFA 32, and the output of EDFA 32, respectively.

Besides the use of optical isolators, specific parameters of sDRA 20, 40 may be designed to maintain a relatively low noise figure (NF) for the inventive fiber-based optical amplifier. In particular, the NF is determined from the following equation:

where $G_{sDRA}$ is the average gain component associated with sDRA 20, 40.

Figure 7:
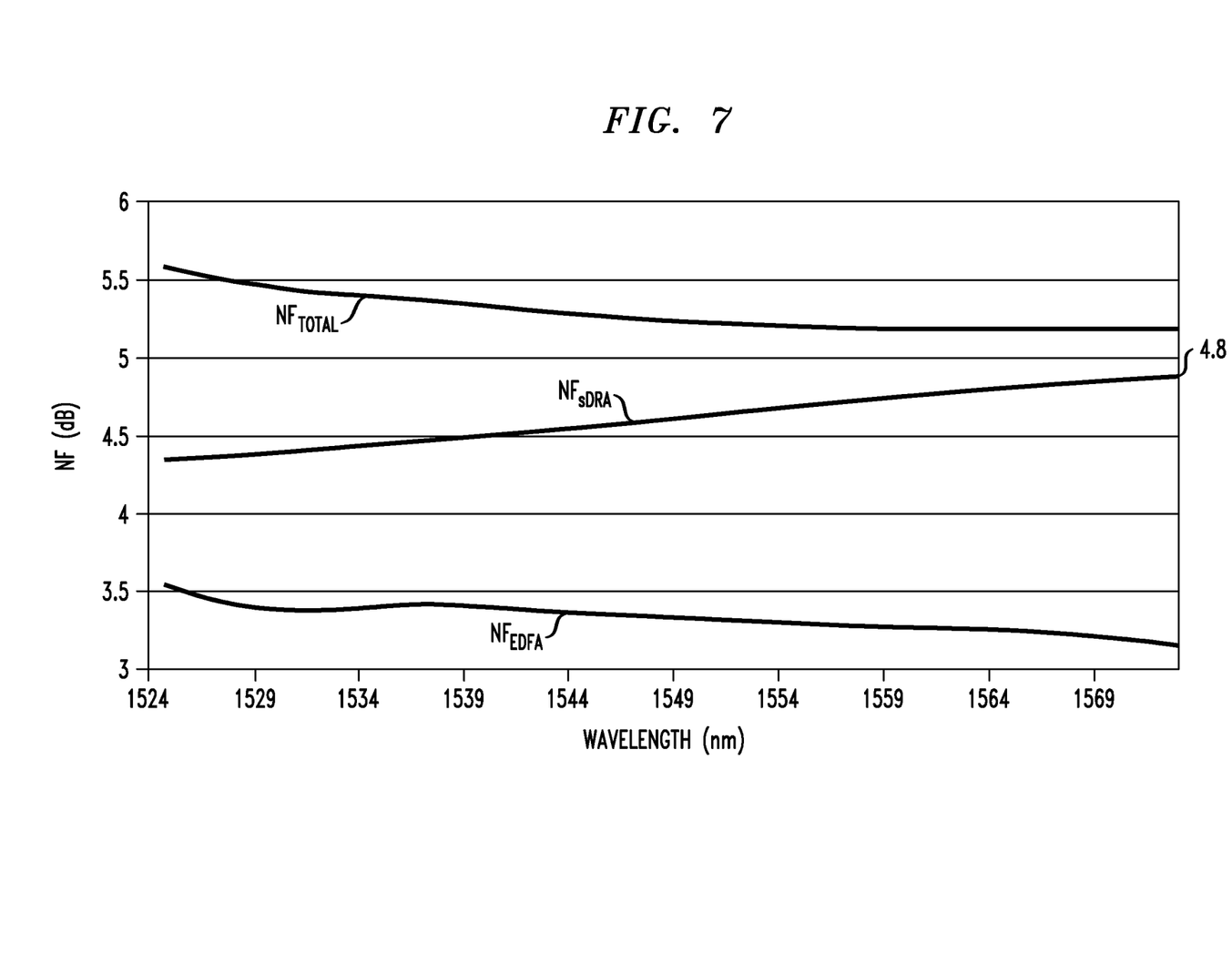
FIG. 7 contains noise figure (NF) plots for both components (EDFA and sDRA) of the amplifier of FIG. 6, as well as the total NF associated with their combination.

FIG. 7 plots the calculated total noise figure of amplifier 60 over the C band, as well as the noise figure components associated with sDRA 40 ($NF_{sDRA}$) and EDFA 32 ($NF_{EDFA}$). In reviewing the $NF_{EDFA}$ plot, it is evident that high Al-ratio EDFA 32 contributes only a small portion of the total NF (since this amplifier is particularly configured to operate at its highly-inverted level), essentially remaining below the value of 3.5 dB. The major NF contribution is from sDRA 40, where the $NF_{sDRA}$ plot shows a maximum NF of 4.8 dB at the long wavelength edge of 1473 nm. However, the NF from this specialized discrete Raman amplifier is relatively low compared to that of conventional discrete Raman amplifiers. This is because sDRA 40 operates in the "small gain" condition by virtue of its specialized characteristics including, for example, a short length of Raman gain fiber 42 (i.e., average gain from sDRA 40 is only about 4.0 dB). Other specialized characteristics may also maintain the "small gain" operation of sDRA 40, such as using a low power pump and perhaps having a gain fiber with a relatively low Raman gain coefficient. Additionally, the use of a backward-pumped arrangement further reduces the overall noise of the Raman amplifier by preventing the relative intensity noise (RIN) of the pump source from being transferred to the propagating optical signals (which occurs in a co-pumped Raman amplifier).

In order to achieve low NF operation, therefore, the net gain from sDRA 40 should be small and the characteristics of Raman gain fiber 42 (and, perhaps, pump source 44) controlled accordingly. It is also expected that the multi-path interference (MPI) is small, due to its operating in the small gain regime.

In many embodiments, the sDRA component of the inventive amplifier will operate in a low signal power regime which it is positioned at the input side of the EDFA component. Therefore, it is expected in these embodiments that the nonlinear impairment from the sDRA will be relatively small. Indeed, in reviewing the total NF plot, it is clear that the highest level remains below 5.5 dB within the 48 nm bandwidth where a sufficient amount of gain is present.

There are other applications, however, where the EDFA component may be positioned as the "input" amplifier, with the sDRA component disposed at the output of the EDFA component. In these situations, either the transmission system is not impacted by the nonlinearity present in the sDRA component, or the nonlinear length of the sDRA is too short to introduce a significant amount of nonlinearity.

Figure 8:
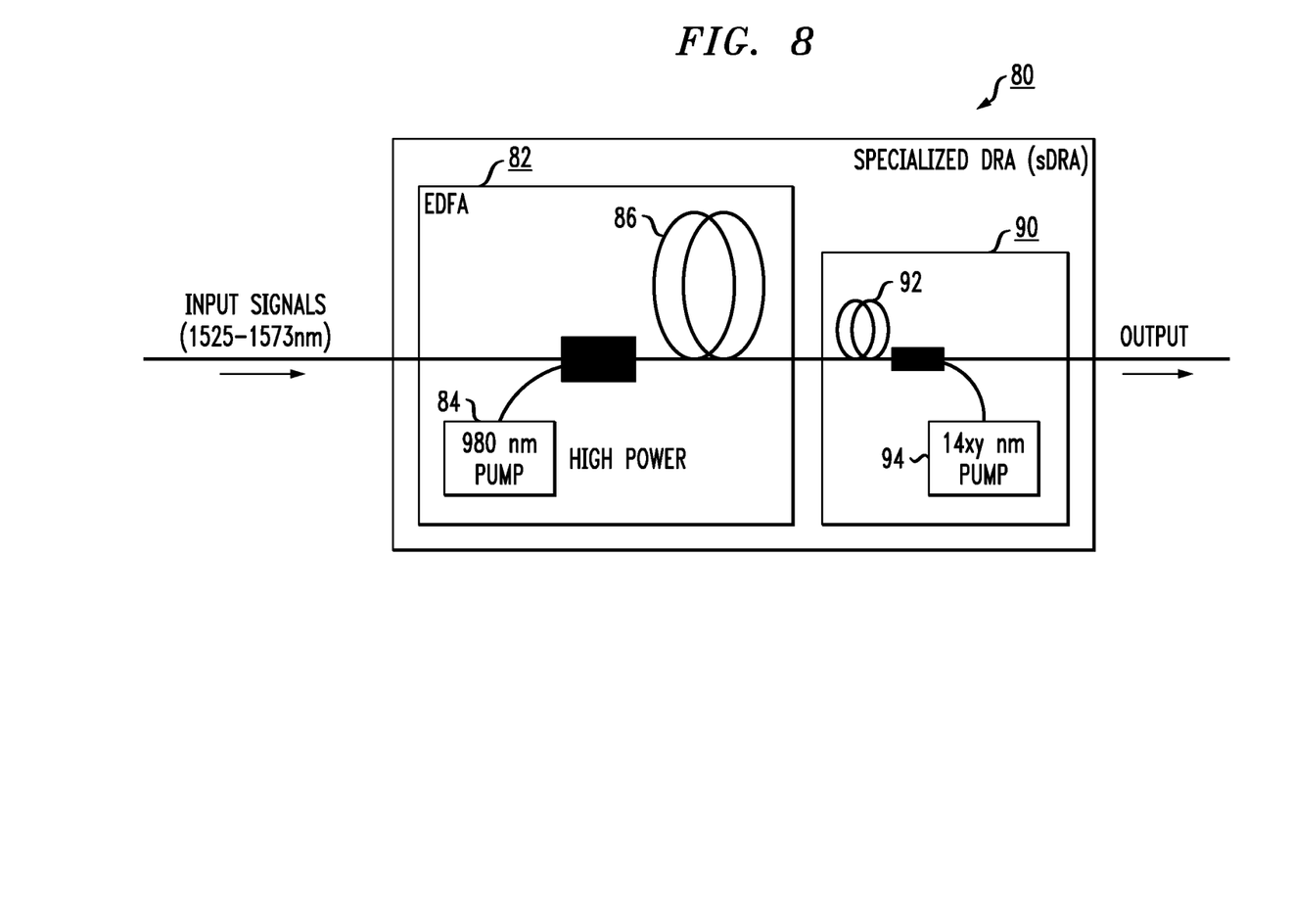
FIG. 8 illustrates yet another embodiment of a wide gain bandwidth C-band optical amplifier formed in accordance with the present invention.

FIG. 8 illustrates an exemplary wide gain bandwidth optical amplifier 80 of the present invention having this particular configuration. As shown, the multiple input signals are coupled into an EDFA 82 operating at a high inversion level by using, for example, a high power pump source 84. Gain fiber 86 may comprise only erbium dopants or, alternatively, may be co-doped with aluminum for providing additional levels of gain as described above. The amplified output from EDFA 82 is thereafter applied as an input to an sDRA 90 that is particularly configured to extend the long wavelength end of the gain bandwidth, as discussed above, as well as reduce the amount of ripple across the gain bandwidth created by EDFA 82. That is, the characteristics of Raman gain fiber 92 (in terms of length, dispersion, effective area, Raman gain coefficient) with perhaps controlling the power level of pump source 94, are utilized to maintain operation in the "small gain" regime for sDRA 90 while also providing the improvements to the amplified output from EDFA 82 in terms of extended gain bandwidth (e.g., up to about 48 nm) and reduced ripple. Indeed, it is possible that the configuration of FIG. 8 may eliminate the need for an additional GFF at the output of the amplifier.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A fiber-based C-band optical amplifier comprising:
an erbium-doped fiber amplifier (EDFA) module operating at a highly inverted level, the EDFA module including a section of erbium-doped optical fiber and a first laser pump source for supplying pump light with a power level sufficient to achieve a high inversion level, wherein one or more optical input signals propagating at wavelengths within the C-band spectral range through the EDFA module are amplified by the presence of pump light; and
a discrete Raman amplifier (DRA) module including a section of optical gain fiber for receiving as an input one or more optical signals propagating at wavelengths within the C-band range and a second laser pump source for supplying pump light to the section of optical gain fiber, the section of optical gain fiber having a length selected to maintain operation in a small gain regime of less than 7 dB, wherein a combination of the EDFA module and the DRA module provides a gain bandwidth of at least 42 nm within the C-band wavelength range of 1525-1573 nm.

2. The fiber-based C-band optical amplifier as defined in claim 1 wherein the section of erbium-doped optical fiber is co-doped with aluminum, exhibiting a defined Al-ratio.

3. The fiber-based C-band optical amplifier as defined in claim 2 wherein the section of erbium-doped fiber has an Al-ratio of at least 0.440.

4. The fiber-based C-band optical amplifier as defined in claim 3 wherein the erbium-doped fiber has an Al-ratio of about 0.446.

5. The fiber-based C-band optical amplifier as defined in claim 1 wherein the first laser pump source operates with an output power in excess of 350 mW such that the EDFA module exhibits an erbium ion inversion level greater than about 0.69.

6. The fiber-based C-band optical amplifier as defined in claim 5 wherein the first laser pump source operates with an output power in excess of 450 mW such that the inversion level of the EDFA module is at least about 0.72.

7. The fiber-based C-band optical amplifier as defined in claim 1 wherein the small gain regime of the DRA module is no greater than 4 dB for the complete C-band wavelength range.

8. The fiber-based C-band optical amplifier as defined in claim 1 wherein the Raman optical gain fiber has a length no greater than about 6 km.

9. The fiber-based C-band optical amplifier as defined in claim 8 wherein the Raman optical gain fiber has a length in the range of about 2-4 km.

10. The fiber-based C-band optical amplifier as defined in claim 1 wherein the Raman optical gain fiber comprises a section of positive dispersion optical fiber exhibiting a positive value of chromatic dispersion across the C-band wavelength range.

11. The fiber-based C-band optical amplifier as defined in claim 10 wherein the Raman optical gain fiber exhibits a positive dispersion of at least 10 ps/km*nm at 1550 nm.

12. The fiber-based C-band optical amplifier as defined in claim 1 wherein the optical amplifier further comprises a gain-flattening filter coupled to the output of the EDFA module.

13. The fiber-based C-band optical amplifier as defined in claim 1 wherein the EDFA module is configured as a co-propagating amplifier and further comprises an optical wavelength division multiplexer (WDM) disposed at the input to the EDFA module for multiplexing the pump light with the propagating optical signals.

14. The fiber-based C-band optical amplifier as defined in claim 1 wherein the DRA module is configured as a counter-propagating amplifier and further comprises an optical WDM disposed at the output of the DRA module, the WDM receiving the pump light from the second pump source at an input port and directing the pump light backwards along the propagating direction of the optical input signals.

15. The fiber-based C-band optical amplifier as defined in claim 1 wherein the DRA module is disposed prior to the EDFA module such that amplified output signals from the DRA module are applied as input signals to the EDFA module.

16. The fiber-based C-band optical amplifier as defined in claim 1 wherein the EDFA module is disposed prior to the DRA module such that the amplified output signals from the EDFA module are applied as input signals to the DRA module.

17. The fiber-based optical amplifier as defined in claim 1 wherein the fiber-based optical amplifier exhibits a gain bandwidth in the range of about 46-48 nm.

18. A method of amplifying optical signals propagating at wavelengths within a wavelength range of 1525-1573 nm, the method comprising:
  applying multiple optical input signals operating in the wavelength range of 1525-1573 nm as an input to a discrete Raman amplifier (DRA), the DRA configured to exhibit a tilted gain profile with increasing gain for longer wavelengths, no greater than 6.6 dB for a long wavelength edge of 1573 nm and an average gain no greater than 4 dB for the complete C-band wavelength range;
  providing amplified optical output signals as a small gain regime output from the DRA, the amplification following the tilted gain profile; and
  applying the amplified optical output signals from the DRA as an input to an erbium-doped fiber amplifier (EDFA) operating at an inversion level of at least 0.69, the combination of the DRA and EDFA creating a gain bandwidth of at least 42 nm within the C-band range.

19. The method as defined in claim 18 wherein the DRA comprises a section of Raman gain fiber of a defined length L less than about 6 km, and the multiple optical input signals are applied as an input to the Raman gain fiber.

20. The method as defined in claim 19 wherein the DRA includes a pump source and the method further comprises directing a low power pump wave in a counter-propagating direction through a section of positive dispersion gain fiber with respect to a propagation direction of the multiple optical input signals.

21. The method as defined in claim 18 wherein the section of Raman optical gain fiber comprises a section of positive dispersion optical fiber.

22. The method as defined in claim 21 wherein the section of positive dispersion gain fiber exhibits a dispersion of at least 10 ps/nm*km at 1560 nm.

23. The method ae defined in claim 18 wherein the EDFA comprises a high Al-ratio EDFA utilizing a gain fiber co-doped with erbium and aluminum.

24. The method as defined in claim 18 wherein the combination of the DRA and the high inversion level EDFA provides a gain bandwidth on the order of about 46-48 nm.

* * * * *